(12) United States Patent
Lee

(10) Patent No.: US 7,127,144 B2
(45) Date of Patent: Oct. 24, 2006

(54) OPTICAL FIBER COMPOSITE POWER CABLE HAVING LOOSE-TUBE-TYPE OPTICAL FIBER IMPREGNATED THEREIN

(75) Inventor: Su-kil Lee, Gunpo-si (KR)

(73) Assignee: LG Cable Ltd., Seoul (KR)

( * ) Notice: Subject to any disclaimer, the term of this patent is extended or adjusted under 35 U.S.C. 154(b) by 0 days.

(21) Appl. No.: 10/933,744

(22) Filed: Sep. 3, 2004

(65) Prior Publication Data

US 2005/0286844 A1    Dec. 29, 2005

(30) Foreign Application Priority Data

Jun. 23, 2004    (KR) .................. 10-2004-0047043

(51) Int. Cl.
*G02B 6/44*    (2006.01)
(52) U.S. Cl. .................. 385/101; 385/109; 385/112
(58) Field of Classification Search ........ 385/100–114, 385/136
See application file for complete search history.

(56) References Cited

U.S. PATENT DOCUMENTS

| | | | |
|---|---|---|---|
| 4,787,705 A | | 11/1988 | Shinmoto et al. |
| 5,448,669 A | * | 9/1995 | Dunn et al. .................. 385/101 |
| 6,169,834 B1 | | 1/2001 | Keller |
| 6,349,161 B1 | * | 2/2002 | Gleason et al. ............. 385/113 |
| 6,922,517 B1 | * | 7/2005 | Matsueda et al. ........... 385/136 |

* cited by examiner

*Primary Examiner*—Phan Palmer
(74) *Attorney, Agent, or Firm*—John P. White, Esq.; Cooper & Dunham LLP

(57) ABSTRACT

Disclosed is an optical fiber composite power cable having a loose-tube-type optical fiber impregnated therein, wherein the optical fibers are installed in a loose tube made of metal to prevent lateral pressure from being imposed on the optical fibers by the metal conductors, even when tensile force or bending force is applied to the cable.

2 Claims, 2 Drawing Sheets

Prior Art

OPTICAL FIBER COMPOSITE POWER CABLE HAVING LOOSE-TUBE-TYPE OPTICAL FIBER IMPREGNATED THEREIN

BACKGROUND OF THE INVENTION

1. Field of the Invention

The present invention relates to an optical fiber composite power cable and more particularly to an optical fiber composite power -able having a loose-tube-type optical fiber impregnated therein which has improved tensile strength and which prevents the optical fiber from being compressed by metal conductors, even when excessive tensile force or bending force is applied to the cable, thereby remarkably reducing the generation of lateral pressure and thus optical loss.

2. Description of the Related Art

Recently, an optical communication method using an optical cable, namely a supreme transmission line for audio and data communication, has been increasingly developed. Thus, optical fiber composite power cables, provided with an optical cable and a power cable, which are impregnated therein, have become popular.

As shown in FIG. 2, an optical power composite interior cable supplied to customers, among the above optical fiber composite power cables, has a structure such that conductors 20 made of a copper wire and an optical fiber 13 are surrounded by a coating layer 40. A filling material 30 fills a gap between the conductors 20 and the optical fiber 13, and is contained in the coating layer 40.

In order to install the optical fiber composite power cable 1 at the end users' locations, such as offices, apartments, stores, etc., as shown in FIG. 1, the optical fiber composite power cable 1 is placed in an electric wire conduit 50 installed in a building. Here, excessive tensile force or bending force may be applied to the cable 1 placed in a part of the electric wire conduit 50.

In case that the excessive tensile force or bending force is applied to the cable 1, lateral pressure is imposed on the optical fiber 13 placed inside the cable 1, thereby causing optical loss. As shown in FIG. 2, since the optical fiber 13 together with the metal conductors 20 is surrounded by the coating layer 40, when tensile force or bending force is applied to the cable 1, the optical fiber 13 is compressed by the metal conductors 20, and the lateral pressure imposed on the optical fiber 13 becomes severe.

Since the optical fiber 13 of the conventional cable 1 is coated with a polymer 15, such as acryl, having a lower strength than that of the metal conductors 20, the optical fiber 13 is easily compressed by the metal conductors 20 when tensile force or bending force is applied to the cable 1, thereby increasing optical loss of the cable 1 due to the lateral pressure.

Recently, in order to reduce the lateral pressure of the cable 1, as shown in FIG. 3, a cable 1, of which reinforcement wires made 25 of metal are inserted into a central portion, has been developed.

Some parts of the cable 1, shown in FIG. 3, are substantially the same as those of the cable 1, shown in FIG. 2, and are thus denoted by the same reference numerals, even though they are depicted in different drawings, and a detailed description of the same parts will thus be omitted because it is considered to be unnecessary.

The cable 1 in FIG. 3 has a comparatively high reinforcing capacity against tensile force. However, since the reinforcement wires 25 compress the optical fiber 13 when tensile force or bending force is applied to the cable 1, they are not strong enough to prevent lateral pressure from being imposed on the optical fiber 13, thus being incapable of reducing optical loss of the cable 1.

Accordingly, in view of the recent trend toward the increasing use of cables, there is required a technique for removing lateral pressure imposed on the optical fiber.

SUMMARY OF THE INVENTION

Therefore, the present invention has been made in view of the above problems, and it is an object of the present invention to provide an optical fiber composite power cable having a loose-tube-type optical fiber impregnated therein, which has an improved tensile strength and prevents the optical fiber from being compressed by metal conductors, even when excessive tensile force or bending force is applied to the cable, thereby remarkably reducing the generation of lateral pressure and thus optical loss.

In accordance with the present invention, the above and other objects can be accomplished by the provision of an optical fiber composite power cable having a loose-tube-type optical fiber impregnated therein, comprising metal conductors and the optical fibers surrounded by a single coating layer, wherein the optical fibers are installed in a loose tube made of metal to prevent lateral pressure from being imposed on the optical fibers due to the compressing of the optical fibers by the metal conductors, even when tensile force or bending force is applied to the cable.

Preferably, the loose tube may be made of stainless steel.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
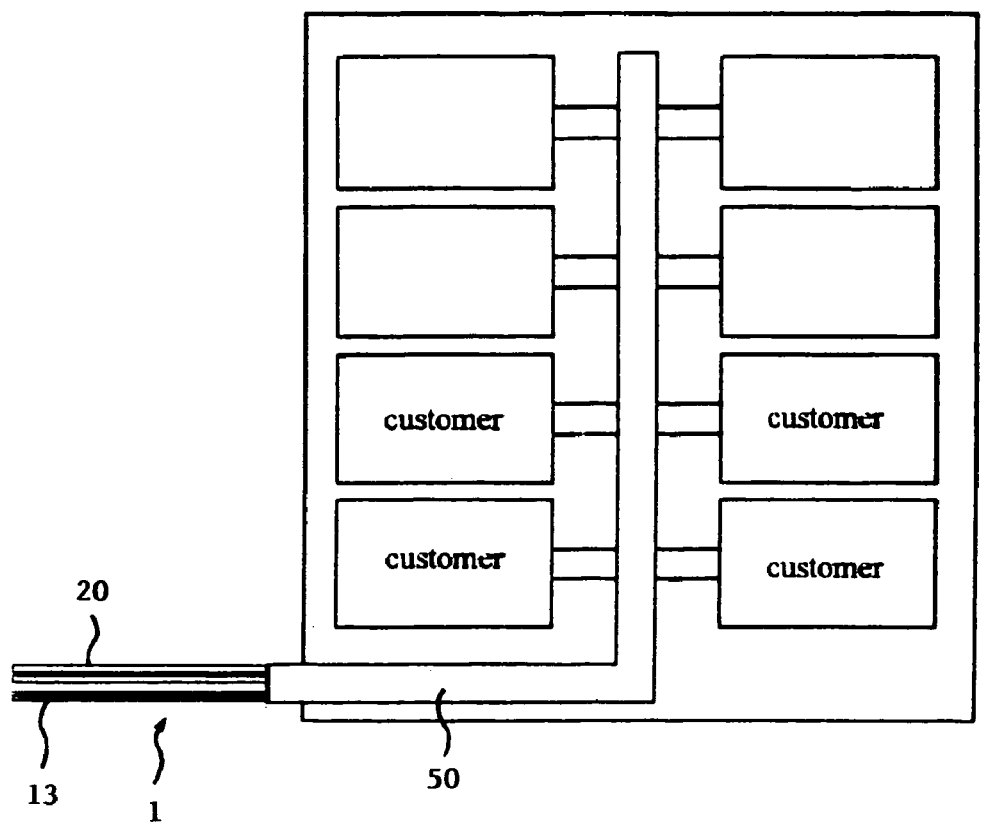
FIG. 1 is a schematic view illustrating the general installation of an optical power composite interior cable.
Figure 2:
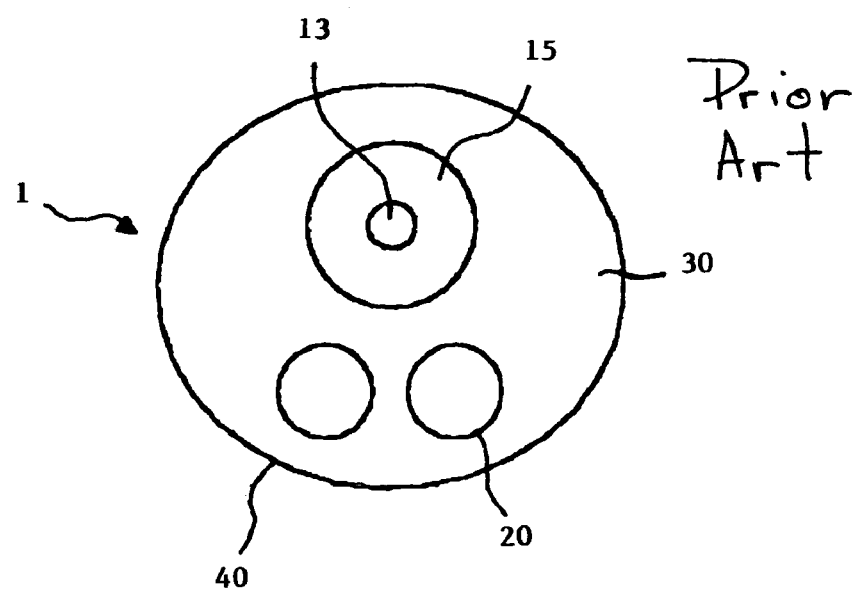
FIG. 2 is a cross-sectional view of a conventional optical power composite interior cable.
Figure 3:
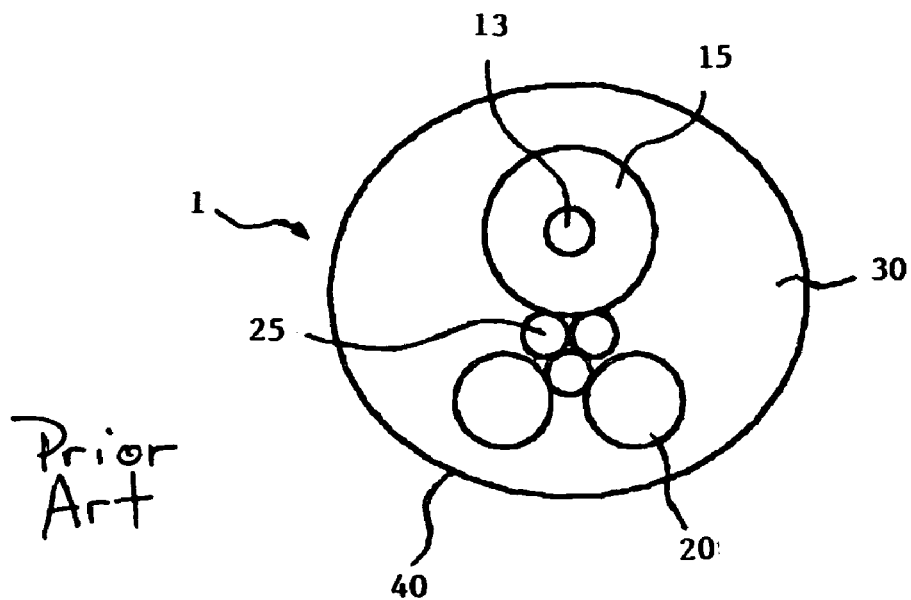
FIG. 3 is a cross-sectional view of another conventional optical power composite interior cable.

Now, a preferred embodiment of the present invention will be described in detail with reference to the annexed drawings.

The embodiment does not limit the scope and spirit of the invention, but is described exemplarily. Some parts in this embodiment, which are substantially the same as those in the prior art, are denoted by the same reference numerals and terms.

Figure 4:
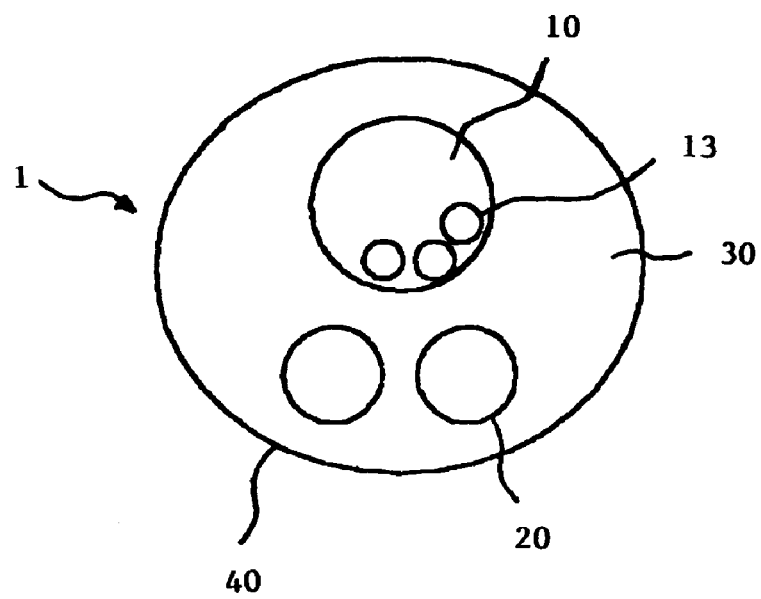
FIG. 4 is a cross sectional view of an optical fiber composite power cable in accordance with the present invention.

FIG. 4 is a cross-sectional view of an optical fiber composite power cable in accordance with the present invention.

As shown in FIG. 4, the optical fiber composite power cable 1 of the present invention comprises metal conductors 20 and optical fibers 13, which are surrounded by the same coating layer 40. The optical fibers 13 are contained in a loose tube 10 made of a metal, thereby preventing lateral pressure from being imposed on the optical fibers 13 due to compression of the optical fibers 13 by the metal conductors 20, even when tensile force or bending force is applied to the cable 1.

The loose tube 10 is made of stainless steel, and has high strength against the tensile force applied to the cable 1 and excellent corrosion resistance. Thus, the loose tube 10 maintains its quality, even when the loose tube 10 is used for a long period of time.

Since the loose tube 10, which is made of stainless steel, is not crushed or deformed even when excessive tensile force or bending force is applied to the cable 1, it is possible to remarkably reduce the generation of lateral pressure imposed on the optical fibers 13 contained in the loose tube 10.

The optical fiber composite power cable 1 has a structure such that the conductors 20, which are generally made of copper, and the loose tube 10 containing the optical fibers 13 are surrounded by the same coating layer 40. The filling material 30, having a high elasticity, fills a gap between the conductors 20 and the loose tube 10, thereby preventing the conductors 20 and the loose tube 10 from moving. The circumference of the filling material 30 is surrounded by the insulated coating layer 40.

Hereinafter, functions and effects of the optical fiber composite power cable 1 of the present invention will be described in detail.

The cable 1 is manufactured by stranding the loose tube 10 containing the optical fibers 13 and the metal conductors 20, filling the filling material 30 into the gap between the loose tube 10 and the metal conductors 20 so that the loose tube 10 and the conductors 20 do not move in the cable, and surrounding the circumference of the filling material 30 with the insulated coating layer 40.

In order to connect the above-described optical power composite interior cable 1 to the end users' locations, the cable 1 is led to the insides of the final customers' location through an electric wire conduit buried in the walls of a building. During the above process, excessive tensile force or bending force may be locally applied to the cable 1.

Since the cable 1 of the present invention comprises the loose tube 10 made of stainless steel therein, the cable 1 having an improved strength is not deformed even when excessive tensile force or bending force is locally applied to the cable 1, and eliminates the generation of lateral pressure imposed on the optical fibers 13 due to compression of the optical fibers 13 by the metal conductors 20.

Accordingly, the cable 1 of the present invention has an improved tensile strength, and remarkably reduces optical loss due to the generation of lateral pressure, without any additional reinforcement wire.

As apparent from the above description, the present invention provides an optical fiber composite power cable having a loose-tube-type optical fiber impregnated therein, which has an improved tensile strength and prevents the optical fiber from being compressed by metal conductors even when excessive tensile force or bending force is applied to the cable, thereby remarkably reducing the generation of lateral pressure and thus optical loss.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An optical fiber composite power cable including optical fibers and metal conductors, the improvement comprising a loosetube containing the optical fibers therein, wherein said loose-tube containing the optical fibers is lateral to, and not surrounded by, said metal conductors, and said loose-tube is made of metal to prevent lateral pressure from being imposed on the optical fibers by the metal conductors when tensile force or bending force is applied to the cable.

2. The optical fiber composite power cable as set forth in claim 1,
wherein the loose tube is made of stainless steel.

* * * * *